United States Patent Office 3,639,347
Patented Feb. 1, 1972

3,639,347
PROCESS FOR THE PREPARATION OF HIGH MOLECULAR WEIGHT POLYOXY-METHYLENE
Shotaro Sugiura and Takami Ishii, Ube-shi, Japan, assignors to Ube Industries, Ltd., Yamaguchi-ken, Japan
No Drawing. Filed July 22, 1968, Ser. No. 746,264
Claims priority, application Japan, July 28, 1967, 42/48,181
Int. Cl. C08g 1/20
U.S. Cl. 260—64
12 Claims

ABSTRACT OF THE DISCLOSURE

Process for the preparation of high molecular weight polyoxymethylene, which comprises polymerizing formaldehyde or a mixture of formaldehyde with a comonomer copolymerizable therewith, in the presence of a catalytic quantity of a mono- or dithio-β-diketone complex.

This invention relates to preparation of high molecular weight polyoxymethylene which comprises polymerization of formaldehyde, or of formaldehyde with other copolymerizable comonomer, in the presence of a metal chelate compound of which at least one of the ligands is mono- or di-thio-β-diketonato, as the polymerization catalyst.

Numbers of proposals have been made in the past, concerning catalyst in the polymerization of formaldehyde for preparing high molecular weight polyoxymethylene. For example, amines, organic phosphorus or arsenic compounds, metal carbonyl compounds, onium compounds, etc. are known for their utility as the polymerization catalyst of high purity formaldehyde. Also when the starting formaldehyde contains minor quantities of impurities such as water and methanol, for example, metal chelate compounds having β-diketonato or aromatic hydroxyaldehydato as the ligands (e.g. U.S. Pat. No. 3,267,076), organic tin compounds, etc. have been proposed as the polymerization catalyst.

However, those known catalysts are effective for the preparation of high molecular weight polyoxymethylene only when the impurities content of the starting formaldehyde is not more than normally 0.5% and at most 1%, the typical impurities being, for example, water, formic acid and methanol. For the polymerization of formaldehyde containing greater quantities of impurities than the above-specified range, polymerization activity of the known catalysts is unsatisfactory. Furthermore, refining of formaldehyde to reduce its impurities content below the critical level requires very complex procedures, which inevitably renders the produced polyoxymethylene rather expensive.

For the above reasons, novel catalyst with which the allowable impurities content of formaldehyde can be high, and which consequently enables production of high molecular weight and tough polyoxymethylene from industrially available formaldehyde of low cost, has been long sought for among the concerned industries.

We have discovered a group of compounds which are useful as the polymerization catalyst of formaldehyde. We furthermore confirmed that when the specific compounds are employed as the catalyst, high molecular weight and tough polyoxymethylene of excellent heat stability can be obtained from such formaldehyde containing as much as 10 weight percent of impurities.

To wit, the invention relates to a process for the preparation of high molecular weight polyoxymethylene which comprises polymerization of formaldehyde or mixtures of formaldehyde with other copolymerizable comonomer, in the presence of, if defined in broadest term, a metal chelate compound of which at least one of the ligands is mono- or di-thio-β-diketonato. The advantages of the subject process reside in the following points:

(A) The catalyst exhibits extremely high polymerization activity, i.e., the polymerization rate is very high.
(B) Since the produced polyoxymethylene has high molecular weight and excellent heat stability, the product is valuable as the material of shaped articles of high strength.
(C) The maximum allowable quantities of impurities, such as water, formic acid, and methanol, in the polymerization system are very high.
(D) The starting materials are free of limitations, since both high purity formaldehyde and un-refined, low purity formaldehyde can be used in the process.

Incidentally, it should be understood that the term "polyoxymethylene" is used in this specification and claims, in the sense including copolymers composed mainly of oxymethylene units but containing a comonomer as copolymerized with formaldehyde.

The specific group of compounds which are useful as the catalyst of the invention can be expressed by a general formula:

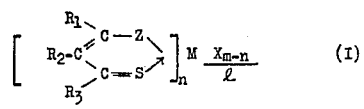

(I)

in which each of $R_1$ and $R_3$ is a radical selected from a group consisting of monovalent hydrocarbons of 1–20 carbons, alkoxy group of 1–10 carbons, thienyls, furyls, and halogen-substituted compounds of the foregoing;
$R_2$ is selected from a group consisting of hydrogen, halogen, monovalent hydrocarbons of 1–20 carbons, alkoxy group of 1–10 carbons and acyl group of 2–10 carbons;
Z is an atom selected from a group consisting of sulfur and oxygen;
M is a metal atom;
X is selected from a group consisting of ligands derived from β-diketones, aromatic hydroxy-aldehydes, condensates of β-diketones with diamines, and condensates of aromatic hydroxy-aldehydes with diamines, oxygen atom and halogen atoms;
$m$ is the valence of the metal atom;
$n$ is an integer of 1 through $m$; and
$l$ is the co-ordinate number or valence of X.

In the above general Formula I, the radicals $R_1$ and $R_3$ can be each selected from monovalent hydrocarbons of 1–20 carbons, such as;

alkyl group including methyl, ethyl, propyl, butyl, hexyl, heptyl, octyl, iso-octyl, stearyl, eicosyl, etc.

aryl group including phenyl, tolyl, xylyl, biphenyl, naphthyl, anthryl, etc.

aralkyl group including benzyl, phenethyl, cumenyl, isopropylbenzyl, etc.

alkenyl or cycloalkenyl group including vinyl, allyl, propenyl, butenyl, 4-dimethyl-3-butenyl, butadienyl, pentenyl, hexenyl, heptenyl, octenyl, cyclopentenyl, cyclopentadienyl, cyclohexenyl, cyclohexadienyl, etc.

aralkenyl group including styryl

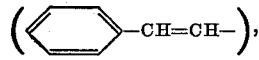

cinnamyl

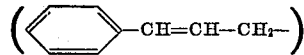

etc.

alkoxy group of 1–10 carbons, such as methoxy, ethoxy, propoxy, butoxy, etc.

thienyl group such as 2-thienyl, 3-thienyl, etc.

furyl group such as 2-furyl, 3-furyl, etc., and halogen-substituted compounds of the foregoing, the substituent being, for example, chlorine, bromine, fluorine, etc.

Inter alia, preferred $R_1$ and $R_3$ are each selected from alkyl group of 1–4 carbons, aryl group of 6–8 carbons, aralkyl group of 7–9 carbons, alkenyl group of 2–4 carbons, cycloalkenyl group of 5–6 carbons, aralkenyl group of 8–9 carbons, alkoxy of 1–4 carbons, 2-thienyl, 2-furyl, and fluorine-substituted compounds of the foregoing.

The radical $R_2$ may be any of monovalent hydrocarbons of 1–20 carbons and alkoxy group which are the alkyl, aryl, aralkyl, alkenyl, cycloalkenyl, aralkenyl and alkoxy groups described concerning radicals $R_1$ and $R_3$. The radical $R_2$ furthermore may be a member of acyl group such as acetyl, propionyl, butyryl, isobutyryl, valeryl, hexanoyl, heptanoyl, octanoyl, heptadecanolyl, stearoyl, acryloyl, crotonoyl, methacryloyl benzoyl, phenylacetyl, toluoyl, atropoyl, cinnamoyl, hydratropoyl, etc.

Preferred $R_2$ include hydrogen, halogens (fluorine, chlorine and bromine), alkyl agroup of 1–4 carbons, aryl group of 6–8 carbons, aralkyl group of 7–9 carbons, alkenyl group of 2–4 carbons, cycloalkenyl group of 5–6 carbons, aralkenyl group of 8–9 carbons, alkoxy group of 1–4 carbons and acyl group of 2–7 carbons.

Preferred mono- or di-thio-β-diketones which serve as the ligands of the compounds of the general Formula I, i.e., the diketones of a general formula

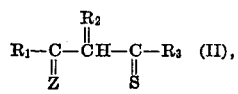

including the following:

Di-(or mono-) thioacetylacetone, di-(or mono-) thiopropionylacetone, di-(or mono-) thiostearoylacetone, di-(or mono-)thionaphthoylacetone, di-(or mono-) thiophenylacetylacetone, di-(or mono-) thionaphthylacetylacetone, di-(or mono-) thioacryloylacetone, di-(or mono-) thioallylolylacetone, di-(or mono-) thioatropoylacetone, di-(or mono-) thiodibenozylmethane, di-(or mono-) thiomethoxycarbonylacetone, di-(or mono-) thio-3-methylacetylacetone, di-(or mono-) thio-3-phenylacetylacetone, di-(or mono-) thio-3-tetradecylacetylacetone, di-(or mono-) thio-3-benzylacetylacetone, di-(or mono-) thio-3-butenylacetylacetone, di-(or mono-) thio-3-methoxyacetylacetone, di-(or mono-) thio-3-ethoxyacetylacetone, di-(or mono-) thio-3-acetylacetylacetone, di-(or mono-) thio-3-benzoylacetylacetone, di-(or mono-) thio-3-bromacetylacetone, di-(or mono-) thio-3-iodoacetylacetone, di-(or mono-) thio-3-chloroacetylacetone, di-(or mono-) thiotrifluoroacetylacetone, di-(or mono-) thiothenoylacetone, di-(or mono-) thiofuroylacetone, di-(or mono-) thio-3-allylacetylacetone, di-(or mono-) thio-furoyltrifluoroaceallylacetylacetone, di-or mono-) thio-thionyl-trifluoroacetone, di-(or mono-) thio-furyltrifluoroacetone, di-(or mono-) thiobenzyltrifluoroacetone, etc.

Referring again to the foregoing general Formula I, the preferred metals represented by M include:

transition metals, for example, Co, Ni, Fe, Th, Mn, Cr, Mo, V, Ti, Zr, and Cu;
alkali metals, for example, Na, K, and Li;
alkaline earth metals, for example, Ca, Be, and Mg;
aluminium (Al);
tin (Sn); and
zinc, cadmium (Zn, Cd).

Among the above-named, particularly preferred metals are Co, Ni, Fe, Th, Mn, Cu, Sn, Zn, and Cd.

In the general Formula I, the ligand represented by X can be derived from the following four groups of compounds, i.e., (1) β-Diketones: for example, compounds represented by a formula,

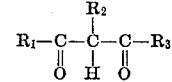

in which $R_1$, $R_2$ and $R_3$ have the same significations as defined as to Formula I:

(2) Aromatic hydroxy-aldehydes; for example, salicylaldehyde, 5-methylsalicylaldehyde, 4-nitrosalicylaldehyde and 5-chlorosalicylaldehyde:

(3) Condensates of β-diketones with diamines, e.g., aliphatic and aromatic diamines of 2–12 carbons; for example, N,N′-ethylene - bis - (acetylacetylideneimine), N,N′-propylene-bis-(acetylacetylideneimine), N,N′-hexamethylene-bis - (acetylacetylideneimine), N,N′-o-phenylene-bis-(acetylacetylideneimine) and N,N′-p-phenylene-bis-(acetylacetylideneimine):

(4) Condensates of aromatic hydroxy-aldehydes with diamines, e.g., aliphatic and aromatic diamines of 2–12 carbons; for example, N,N′ - ethylene - bis - (salicylideneimine), N,N′-propylene - bis - (salicylideneimine), N,N′-hexamethylene-bis-(salicylideneimine), N,N′-o-phenylene-bis-(salicylideneimine) and N,N′-p-phenylene-bis-(salicylideneimine).

And, the X may also be
(5) Oxygen atom, or
(6) Halogen atoms, e.g., chlorine, fluorine, bromine and iodine.

For an explanatory purpose, the structure of the compounds represented by the general Formula I, which contain the ligands of the foregoing groups (1) through (4) will be illustrated with a few specific examples as follows:

(1)

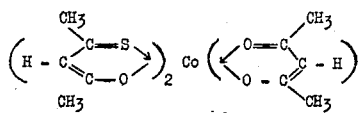

bis(monothioacetylacetonato) (acetylacetonato)cobalt (III)

(2)

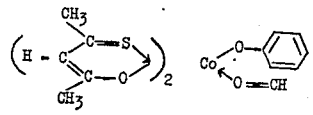

bis(monothioacetylacetonato) (salicylaldehydato) cobalt (III)

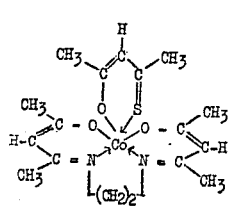

(monothioacetylacetonato) N,N'-ethylene-bis-(acetylacetyl-ideneiminato) cobalt (III)

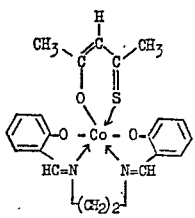

(monothioacetylacetonato) N,N'-ethylene-bis-(salicylidene-iminato) cobalt (III)

In accordance with the invention, it is preferred that $n$ and $m$ in the general Formula I to be equal.

Particularly preferred compounds of the Formula I in the subject invention include the following:

Bis(dithioacetylacetonato) cobalt (II),
Bis(dithioacetylacetonato) nickel (II),
Bis(dithioacetylacetonato) iron (II),
Tetrakis(dithioacetylacetonato) thorium (IV),
Tris(dithioacetylacetonato) manganese (III),
Tris(dithioacetylacetonato) cobalt (III),
Tris(dithioacetylacetonato) vanadium (III),
Tetrakis(dithioacetylacetonato) zirconium (IV),
Bis(dithioacetylacetonato) copper (II),
(Dithioacetylacetonato) lithium,
Bis(dithioacetylacetonato) magnesium (II),
Bis(dithioacetylacetonato) calcium (II),
Bis(dithioacetylacetonato) zinc (II),
Bis(dithioacetylacetonato) cadmium (II),
Tris(dithioacetylacetonato) aluminium (III),
Bis(dithioacetylacetonato)-(dimethylato) tin (VI),
Bis(dithioacetylacetonato) oxomolybdenum (VI),
Bis(dithiobenzoylacetonato) cobalt (II),
Bis(dithiofuroylacetonato) cobalt (II),
Bis(dithio-3-phenylacetylacetonato) cobalt (II),
Bis(dithio-3-phenylacetylacetonato) copper (II),
Bis(dithio-3-phenylacetylacetonato) manganese (II),
Bis(dithio-3-allylacetylacetonato) cobalt (II),
Bis(dithio-3-bromacetylacetonato) cobalt (II),
Bis(dithio-3-acetylacetonato) cobalt (II),
Tris(dithio-3-phenylacetylacetonato) cobalt (III), and also the compounds in which the "dithio" portion of the foregoing compounds is changed to "monothio."

The compounds of the foregoing Formula I to be employed in the subject process can be readily prepared by the means known per se, e.g. synthesis of β-diketone metal chelate disclosed in Inorganic Synthesis: vol. II, pp. 10–17, 25, 119, 121, 123; vol. V, pp. 108, 109, 113, 130; vol. VI, p. 188. Pub. by McGraw Hill, N.Y., Mark M. Jones, J.A.C.S., 81, 3188 (1959), from mono- or dithio-β-diketone of the foregoing general Formula II.

For example:
(i) the compounds of the formula

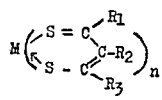

can be prepared by the procedures comprising dissolving a n-valent metal salt less than equivalent amount in an alcohol solution of excess amount of corresponding β-diketone,

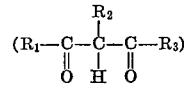

causing the solution to absorb hydrogen chloride gas, further introducing hydrogen sulfide gas sufficiently into the solution while the system is cooled with ice, and separating the crystalline precipitate by filtration.

(ii) Also

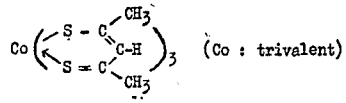

can be prepared from cobalt carbonate and dithioacetyl-acteone, and

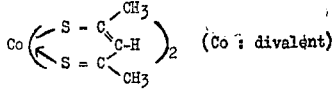

can be prepared from cobalt chloride (CoCl$_2$) and dithio-acetylacetone.

(iii) The compound of the formula

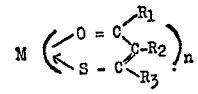

can be prepared by selecting properly the reaction conditions of (i), namely decreasing the moles introduced of hydrogen sulfide.

(iv) The compound of the formula

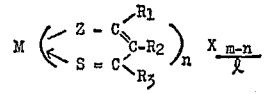

wherein $$\frac{m-n}{l}$$

is not zero, can be prepared by utilizing the above-mentioned method of synthesizing β-diketone and employing an excessive amount of the n-valent metal salt.

(v)
(a) The metal chelate of the Formula I in which X is zero, can be synthesized by introducing hydrogen sulfide into an alcohol solution of a metal oxide and a β-diketone acidified by hydrochloric acid.

For example, VO(C$_5$H$_7$S$_2$)$_2$ is prepared by passing hydrogen sulfide gas through a hydrochloric acid-acidified system composed of vanadium (V) oxide and acetylacetone which are dissolved in an alcohol as the reaction medium.

(b) Synthesis of metal chelate in which X is a β-diketone:
First

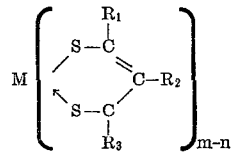

is prepared by the procedure (i), and the resultant crystalline product is suitably adjusted of its pH in an alcoholic solution of β-diketone.

(c) Synthesis of metal chelate in which X is salicylaldehyde (aromatic hydroxy-aldehyde):

First

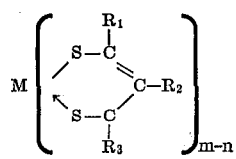

is prepared by the procedure (i), and the resultant crystalline product is suitably adjusted of its pH in an alcoholic solution of salicylaldehyde.

(d) Synthesis of metal chelate in which X is a condensation product of a $\beta$-diketone and diamine.

The procedure disclosed in Richard J. Hovey: J.A.C.S, 81, 3189 (1959) is applied.

(e) Synthesis of metal chelate in which X is a condensation product of an aromatic hydroxy-aldehyde with diamine:

The procedure disclosed in T. Tsumaki: Ann., 503, 84 (1933) is applied.

The compounds of the Formula I of the invention can be used each by itself, or in combination with Lewis acid such as $BF_3$, $BF_3OEt_2$, $SbF_3$, $SnCl_4$, $FeCl_3$, $TiCl_4$, $AlCl_3$, etc.: or Lewis base such as triethylamine, tri-n-butylamine, tri-phenylamine, etc., as the polymerization catalyst in the preparation of polyoxymethylene. In all cases the products possess high molecular weight level which cannot be attained under the catalytic activity of a Lewis acid or base alone. The Lewis acid and base can be used at a ratio of $1/100$–1 mol per mol of the compound of Formula I.

Formaldehyde usable in the subject process may be that which has been refined to a high purity level, or that containing impurities such as water, methanol and formic acid up to approximately ten weight percent in total (methanol and formic acid content being each no more than five weight percent). To wit, formaldehyde obtained by thermal decomposition of optionally refined para-formaldehyde $\alpha$-polyoxymethylene, or hemiformal of higher alcohol (octanol, cyclohexanol, polyethylene glycol, etc.); or formaldehyde obtained by acid catalytic decomposition of trioxane or tetraoxane can be used. The latter two groups of formaldehydes may be used as they are if their impurities content is within the specified range, or may be first refined and eliminated of the impurities. Also the formaldehyde obtained by distillation purification of aqueous Formalin can be used without further processing, if its impurities content is within the above-specified range.

Also the catalyst of the foregoing general Formula I of the invention is useful for the preparation of high molecular weight copolymers containing no less than 50 mol percent, preferably 90–99 mol percent, of oxymethylene unit, by the polymerization of mixtures of formaldehyde with other comonomer which are copolymerizable with formaldehyde.

Suitable comonomers which are copolymerizable with formaldehyde include: carbon monoxide, ketenes, cyclic ethers, and alkyleneimines. As the ketenes, those of 2–14 carbons such as ketene, ethylketene, methylketene, dimethylketene, diethylketene, diphenylketene, etc. can be used. Useful cyclic ethers include alkylene oxides such as ethylene oxide and propylene oxide; and 1,3-dioxolans such as 1,3-dioxolan, 5-methyl-1,3-dioxolan, 5-phenyl-1,3-dioxolan, 2-ethyl-1,3-dioxolan, etc. As the alkyleneimines, ethyleneimine and N-acetylethyleneimine may be named. Preferably, those comonomers are used at a ratio of $1/100$–$1/10$ mol per mol of formaldehyde.

For the preparation of high molecular weight, tough polyoxymethylene by polymerization of formaldehyde, conventionally the use of well-refined, high purity formaldehyde is required. Even in a few, special methods which allow the use of impurities-containing formaldehyde, the maximum allowable impurities content of the formaldehyde is at most 1%.

In accordance with the subject invention, it is possible to produce high molecular weight, tough polyoxymethylene from formaldehyde containing relatively large quantities of impurities. Thus, with the present process the costly purification step of formaldehyde can be omitted. This is one of the most advantageous features of the invention.

According to the subject process, the formaldehyde or a mixture of formaldehyde with copolymerizable comonomer is contacted with the catalytic quantity of a compound of the Formula I, preferably in a quantity of $10^{-4}$–10 millimols per mol of aforesaid monomer. In the procedure, the monomeric system may be of gaseous or liquid phase, and the catalyst may be in the state of solution or solid.

The polymerization temperature and pressure somewhat vary depending on the type of catalyst and manner of polymerization. Generally, however, it is preferred to perform the polymerization at temperatures ranging $-78°$–$+100°$ C., under pressures of atmospheric to 300 atmospheres (gauge). The polymerization atmosphere may be of air or other gases, such as $N_2$, $CO_2$, CO, $H_2$; aliphatic saturated hydrocarbons such as methane, ethane, propane, etc.; aliphatic unsaturated hydrocarbons such as ethylene, propylene, butadiene, etc.; cycloaliphatic hydrocarbons such as cyclohexane, cyclopentane, etc.; and aromatic hydrocarbons such as benzene, toluene, xylene, etc.

In practice, the subject process is preferably performed by any of solution, blow, or vapor phase polymerization, each of which being explained hereinbelow. Although the homo-polymerization of formaldehyde alone is discussed in the following explanations, it should be understood that the identical polymerization methods are applicable also to the combinations of formaldehyde with other comonomer which are copolymerizable with formaldehyde.

Solution polymerization

Formaldehyde is dissolved in a liquid reaction medium, preferably an inert solvent, and the catalyst is added to the solution to induce the polymerization of formaldehyde.

In this method, such liquid reaction media as aliphatic hydrocarbons such as n-butane, n-heptane and iso-octane; aromatic hydrocarbons such as benzene, toluene, and xylene; cycloaliphatic hydrocarbons such as cyclohexane; halogenated hydrocarbons such as carbon tetra- and chlorobenzene; ketones such as acetone and methyl ethyl ketone; ethers such as diethylether and diisobutylether; and esters such as ethyl acetate and ethyl acetoacetate, can be used either singly or as a mixture. Furthermore, carbon disulfide or liquid carbon dioxide can also be used either by itself or as mixtures with other liquid reaction medium. The reaction medium may contain up to a total of approximately 10% by weight of impurities such as water, methanol and formic acid.

Suitable concentration of formaldehyde in the liquid polymerization system ranges 2–80% by weight. When the formaldehyde concentration is excessively high, the entire system transfers to solid state near the end of polymerization step, due to the polyoxymethylene precipitated as solid. This often renders subsequent operations, such as withdrawal of polymeric product, complex and difficult. Therefore, preferred highest formaldehyde concentration is approximately 50%, in view of easy handling of polymerization product.

Conventionally, solution polymerization of formaldehyde has been performed at very low formaldehyde concentration, in the purpose of obtaining high molecular weight polyoxymethylene, i.e., at such low concentration that immediately upon the introduction of formaldehyde into the polymerization system, polymerization of entire formaldehyde in the system takes place.

However, in accordance with the subject invention, high molecular weight polyoxymethylene can be prepared from such high concentration solution of formaldehyde as described in the above, by the use of a metal chelate compound of which at least one of the ligands is mono- or di-thio-β-diketonato, as the polymerization catalyst. Consequently, the size of the polymerization vessel can be reduced with economical advantage.

The appropriate quantity of the catalyst to be employed is $1 \times 10^{-4}$–10 millimols per one liter of the formaldehyde solution.

It is also permissible to add a capping agent such as acetic anhydride to the liquid reaction medium in advance of the polymerization, in accordance with accepted practices.

Blow polymerization

According to this method, the catalyst is dissolved in a liquid reaction medium, and into which formaldehyde gas is blown continuously, whereby continuously polymerizing formaldehyde as it is introduced into the solution.

The formaldehyde gas may be blown together with nitrogen or carbon dioxide.

The liquid reaction medium useful in this method is selected from the same group of reaction media usable in the solution polymerization. Also the allowable impurities content of the medium, and polymerization temperature and pressure conditions are identical with the case of solution polymerization. The suitable concentration of the catalyst in the liquid medium is $1 \times 10^{-4}$–10 millimols per liter.

Vapor phase polymerization

In this method, formaldehyde gas is fed into a polymerization vessel, and into which a solution of the catalyst dissolved in a minor quantity of the liquid reaction medium described in the foregoing is sprayed to cause polymerization of formaldehyde. The appropriate polymerization temperature ranges $-10°$–$+80°$ C., and the pressure may be atmospheric or elevated.

By any of the foregoing polymerization methods, high molecular weight, tough polyoxymethylene of excellent heat stability can be obtained from high purity formaldehyde or that which contains no more than 10% by weight of impurities in total (in which methanol and formic acid contents being each not more than 5% by weight).

In the polymerization process in accordance with the invention, it is also permissible to add a deterioration inhibitor such as diphenylamine, bis(β-naphthylamine) or p-phenylenediamine to the polymerization system. In that case, the suitable quantity of the deterioration inhibitor is normally 0.01–1% by weight of the formaldehyde.

Also in order to control the molecular weight of produced polyoxymethylene, any suitable chain transfer agent, such as, for example, water; aliphatic alcohol such as methanol or ethanol; organic acid such as formic, acetic, or benzoic acid; acid anhydride such as acetic, propionic, or benzoic anhydride; and ortho-carboxylate such as o-methyl formate, o-methyl acetate, etc.; may be added to the polymerization system.

The polyoxymethylene prepared in accordance with the subject invention can be stabilized by the means known per se. For example, the polymer may be reacted with acetic anhydride in the presence of a basic catalyst to acylate the former's end groups.

Preferably, the high molecular weight polyoxymethylene obtained in accordance with the process is stabilized by the action of a capping agent, in the presence of a catalytic quantity of Lewis acid. (Hereinafter this stabilization means may be referred to as chipping stabilization process.)

The manner of practicing this process is not critical, but conveniently a polyoxymethylene homopolymer or copolymer is added to a solvent, and to the solution a capping agent is added with thorough agitation. The reaction is continued at an optional pressure in the presence of a Lewis acid, until polyoxymethylene of suitable molecular weight is formed. The reaction is terminated by the addition of a suitable quantity of a substance such as methanol, cyclohexanone or triethylamine, to the reaction liquid. The capping agent and Lewis acid may be added to the polymer in spray or gaseous form.

As the Lewis acid useful for the chipping stabilization process, halogenides such as $BF_3$, $BF_3$—$O(C_2H_5)_2$, $BF_3$—$O(C_6H_5)_2$, $TiCl_4$, $TiCl_3$, $VCl_3$, $SiCl_4$, $SnCl_4$, $AlCl_3$, $FeCl_3$, etc., and complex compounds of the foregoing may be named.

The capping agent useful for this stabilization includes: cyclic ethers such as 1,3-dioxolan, ethylene oxide, propylene oxide, and 3,3-bis-chloromethylcyclooxabutane; alkyleneimines such as ethyleneimine and N-acetylethyleneimine; lactone compounds such as β-propiolactone and ε-caprolactone; acid anhydrides such as acetic, maleic, and phthalic anhydrides; vinyl compounds such as methyl methacrylate and acrylonitrile; isocyanate compounds and olefin compounds.

Presence of liquid medium is not always required in this stabilization reaction, but when used, the medium can be selected from such compounds as aromatic, cycloaliphatic and aliphatic hydrocarbons, halogen-substituted hydrocarbons, ethers, ketones, esters and amides. As more specific examples, the following may be named: benzene, toluene, cyclohexane, n-hexane, n-heptane, petroleum benzine, petroleum ether, gasoline, kerosene, liquid paraffin, carbon tetrachloride, chloroform, ethylene dichloride, ethyl ether, acetone, methyl ethyl ketone, ethyl acetate, and butyl acetate.

The quantity of Lewis acid catalyst may range 0.001–10 millimols/g. to polyoxymethylene, preferably 0.01–1 millimol/g.

The quantity of capping agent is no less than 1% by weight of the polyoxymethylene, preferably 10–1,000% by weight.

The stabilization reaction can be performed at temperatures ranging from $-100°$ to $+200°$ C., preferably from $-10°$ to $+50°$ C. Normally it is convenient to perform the reaction around room temperature.

Thus, stabilized polyoxymethylene of optional molecular weight can be easily prepared by selecting specific reaction conditions, considering the correlation of reaction time, catalyst concentration and reaction temperature with molecular weight of stabilized polyoxymethylene.

The critical features of the above-described stabilization reside in that the capping operation can be performed at relatively low temperatures such as room temperature, and that the obtained polymer exhibits markedly improved heat stability over that of conventionally stabilized products.

The molecular weight of the polyoxymethylene produced in accordance with the subject process is, when expressed by intrinsic viscosity $[\eta]$, no less than 3. The end-stabilized polymer exhibits toughness of no less than 1,000, when measured by the later-specified measurement method.

Hereinafter the invention will be described in detail, with reference to the working examples.

In the examples, thermal decomposition constant, $K_{222}$, is determined as follows. Approximately 1 g. of sample polymer is accurately weighed with chemical balance, and packed in an ampule. One end of the ampule is opened and exposed to air, while the ampule is placed in a vapor bath of methyl salicylate of 222° C. During the subsequent 40 minutes, pyrolyzed quantity of the polymer was determined at 1 minute intervals, and a time-remaining polymer (wt. percent, logarithm) curve is drawn as to the last 30 minutes, eliminating the initial 10 minutes. The thermal decomposition constant $K_{222}$ is determined from gradient of this curve, which is expressed by the unit of percent/min. since the thermal decomposition can be regarded as substantially a primary reaction.

The intrinsic viscosity $[\eta]$ is determined in parachlorophenol solution system containing 2% of α-pinene, at 60° C.

The toughness is measured as to approximately 0.1 mm. thick sample film of the polymer, which is folded at 180°. Thereafter it is folded at 360° to the opposite direction on the first folded line. Then 360° folding is repeated, and the number of this folding operation repeated until the breakage of the film along the folded line is counted.

All the percentages are by weight.

EXAMPLES 1–103

The structure of the apparatus used in these examples was as follows.

As the pyrolysis vessel, a 1-liter capacity, three neck flask was employed, one of the necks thereof being communicated with one neck of a 2-liter capacity, four neck flask which served as the polymerization vessel, by means of a glass tube of 10 mm. in inner diameter for feeding formaldehyde gas. The portion of the glass tube outside the pyrolysis and polymerization vessels was wound with a ribbon heater, whereas the portion thereof inside the polymerization vessel is given air-tightly closed double walls. Between the walls, Nichrome wire for electric heating was sealed. The pyrolysis vessel was heatable on an oil bath, and the polymerization vessel was coolable with Dry Ice-methanol bath. The polymerization vessel furthermore was equipped with a stirrer, thermometer and exhaust pipe.

150 grams of paraformaldehyde containing 3.5% of water, 2.0% of methanol and 0.1% of formic acid was poured in the pyrolysis vessel, and 1 liter of industrial toluene was put in the polymerization vessel. The position of glass tube for feeding formaldehyde gas was so adjusted that the front end thereof opened closely to the surface level of toluene. The glass tube was heated to approximately 150° C. with the ribbon heater and electrothermic Nichrome wire, while the toluene in the polymerization vessel was cooled to approximately −50° C. and stirred. Upon heating the pyrolysis vessel with the oil bath of approximately 180° C., paraformaldehyde was decomposed and formaldehyde gas containing water, methanol and formic acid was generated, which was led to the polymerization vessel through the glass tube and absorbed by the toluene which was maintained at −50° C., with substantially 100% absorption efficiency. The formaldehyde gas supply was terminated after 2 hours of continuous operation. Whereupon a toluene solution containing 100 g. of formaldehyde was obtained. No adhesion of polymer on the glass tube wall was observed, but the decomposition product from the pyrolysis vessel was completely absorbed in the toluene. The formaldehyde containing 3.5% of water, 2.0% of methanol and 0.1% of formic acid was polymerized by raising the temperature of the toluene solution to −10° C., in the presence of 0.01 millimol of the catalyst varied in each run, as indicated in Table 1 below. The polymerization was continued for 60 minutes, and terminated by adding 200 cc. of methanol to the resultant polyoxymethylene suspension. The polyoxymethylene was recovered by filtration, and washed each twice with acetone and methanol, followed by drying under a reduced pressure for 3 hours at approximately 80° C. The yield and intrinsic viscosity [$\eta$] of polyoxymethylene in each run are indicated also in Table 1.

The polyoxymethylenes were stabilized by the chipping stabilization process (process comprising chipping the main chains of polyoxymethylene molecules and acetylating the terminal of chipped polyoxymethylene).

The stabilization was practiced as follows. Ten grams of polyoxymethylene sample was added to 200 cc. of 50% toluene solution of acetic anhydride, and reacted at 100° C. for 10 minutes in the presence of 0.2 millimol of $$BF_3-O(C_2H_5)_2$$

as the catalyst. Then the polymer was filtered, washed with methanol and acetone, and dried. The intrinsic viscosity [$\eta$], thermal decomposition constant $K_{222}$, and toughness of thus stabilized polyoxymethylene of each run are also given in Table I.

TABLE I

| Example No. | $R_1$ | $R_2$ | $R_3$ | N | X | M | Catalyst | Unstabilized polymer Yield, percent | Unstabilized polymer ($\eta$) | Stabilized polymer ($\eta$) | Stabilized polymer $K_{222}$ | Toughness |
|---|---|---|---|---|---|---|---|---|---|---|---|---|
| 1 | —CH$_3$ | —H | —CH$_3$ | S | | Co$^{+2}$ | Bis(dithioacetylacetonato) cobalt (II). | 95 | 5.2 | 1.8 | 0.09 | >1,000 |
| 2 | —CH$_3$ | —H | —C$_2$H$_5$ | S | | Co$^{+2}$ | Bis(dithiopropionylacetonato) cobalt (II). | 93 | 4.9 | 1.7 | 0.06 | >1,000 |
| 3 | —CH$_3$ | —H | —(CH$_2$)16—CH$_3$ | S | | Co$^{+2}$ | Bis(dithiostearoylacetonato) cobalt (II). | 95 | 4.9 | 1.7 | 0.07 | >1,000 |
| 4 | —CH$_3$ | —H | 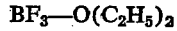 | S | | Co$^{+2}$ | Bis(dithiobenzoylacetonato) cobalt (II). | 92 | 4.6 | 1.6 | 0.07 | >1,000 |
| 5 | —CH$_3$ | —H | (naphthyl) | S | | Co$^{+2}$ | Bis(dithionaphthoylacetonato) cobalt (II). | 95 | 4.8 | 1.7 | 0.06 | >1,000 |
| 6 | —CH$_3$ | —H | (tolyl-CH$_3$) | S | | Co$^{+2}$ | Bis(dithiotoluoylacetonato) cobalt (II). | 98 | 5.4 | 1.8 | 0.05 | >1,000 |
| 7 | —CH$_3$ | —H | (benzyl-CH$_2$) | S | | Co$^{+2}$ | Bis(dithiophenylacetylacetonato) cobalt (II). | 96 | 4.8 | 1.7 | 0.05 | >1,000 |

3,639,347

TABLE 1—Continued

| Example No. | $R_1$ | $R_2$ | $R_3$ | Z | X | M | Catalyst | Unstabilized polymer Yield, percent | Unstabilized polymer $(\eta)$ | Stabilized polymer $(\eta)$ | Stabilized polymer $K_{222}$ | Stabilized polymer Toughness |
|---|---|---|---|---|---|---|---|---|---|---|---|---|
| 8 | —CH₃ | —H | —CH₂—(naphthyl) | S | | Co⁺² | Bis(dithionaphtylacetylacetonato) cobalt (II). | 96 | 4.6 | 1.8 | 0.06 | >1,000 |
| 9 | —CH₃ | —H | —CH=CH₂ | S | | Co⁺² | Bis(dithioacryloylacetonato) cobalt (II). | 90 | 4.0 | 1.6 | 0.05 | >1,000 |
| 10 | —CH₃ | —H | —CH₂—C=CH₂ | S | | Co⁺² | Bis(dithioallyloylacetonato) cobalt (II). | 93 | 4.2 | 1.7 | 0.05 | >1,000 |
| 11 | —CH₃ | —H | —(CH₂)₂—CH=C(CH₃)₂ | S | | Co⁺² | Bis(dithio-5-dimethyl-4-heptenoylacetonato) cobalt (II). | 96 | 5.0 | 1.7 | 0.04 | >1,000 |
| 12 | —CH₃ | —H | —C(phenyl)=CH₂ | S | | Co⁺² | Bis(dithioatropoylacetonato) cobalt (II). | 94 | 5.0 | 1.6 | 0.05 | >1,000 |
| 13 | —CH₃ | —H | —OCH₃ | S | | Co⁺² | Bis(dithiomethoxycarbonylacetonato) cobalt (II). | 96 | 4.8 | 1.7 | 0.05 | >1,000 |
| 14 | —CH₃ | —H | —OC₂H₅ | S | | Co⁺² | Bis(dithioethoxycarbonylacetonato) cobalt (II). | 94 | 5.0 | 1.8 | 0.06 | >1,000 |
| 15 | —CH₃ | —H | (thienyl) | S | | Co⁺² | Bis(dithiothenoylacetonato) cobalt (II). | 96 | 4.0 | 1.7 | 0.08 | >1,000 |
| 16 | —CH₃ | —H | (furyl) | S | | Co⁺² | Bis(dithiofuroylacetonato) cobalt (II). | 94 | 3.8 | 1.8 | 0.06 | >1,000 |
| 17 | —CH₃ | —H | —CF₃ | S | | Co⁺² | Bis(dithiotrifluoroacetylacetonato) cobalt (II). | 95 | 3.6 | 1.8 | 0.08 | >1,000 |
| 18 | —CH₃ | —H | —CHCl₂ | S | | Co⁺² | Bis(dithiodichloroacetylacetonato) cobalt (II). | 97 | 3.8 | 1.6 | 0.06 | >1,000 |
| 19 | —CH₃ | —H | —CH₂I | S | | Co⁺² | Bis(dithiojodacetylacetonato) cobalt (II). | 98 | 4.0 | 1.7 | 0.07 | >1,000 |
| 20 | —CH₃ | —H | Br—(phenyl)— | S | | Co⁺² | Bis(dithiobromobenzoylacetonato) cobalt (II). | 94 | 4.2 | 1.8 | 0.06 | >1,000 |
| 21 | —CH₃ | —H | Cl—(phenyl)—CH₂— | S | | Co⁺² | Bis(dithiochlorophenylacetylacetonato) cobalt (II). | 97 | 3.8 | 1.7 | 0.05 | >1,000 |
| 22 | —CH₃ | —CH₃ | —CH₃ | S | | Co⁺² | Bis(dithio-3-methylacetylacetonato) cobalt (II). | 97 | 4.5 | 1.4 | 0.09 | >1,000 |
| 23 | —CH₃ | —C₂H₅ | —CH₃ | S | | Co⁺² | Bis(dithio-3-ethylacetylacetonato) cobalt (II). | 96 | 4.8 | 1.6 | 0.06 | >1,000 |
| 24 | —CH₃ | —CH₂—(CH₂)₁₂—CH₃ | —CH₃ | S | | Co⁺² | Bis(dithio-3-tetradecylacetylacetonato) cobalt (II). | 98 | 5.0 | 1.6 | 0.04 | >1,000 |
| 25 | —CH₃ | —(phenyl) | —CH₃ | S | | Co⁺² | Bis(dithio-3-phenylacetylacetonato) cobalt (II). | 99 | 4.8 | 1.5 | 0.07 | >1,000 |
| 26 | —CH₃ | —CH₂—(phenyl) | —CH₃ | S | | Co⁺² | Bis(dithio-3-benzylacetylacetonato) cobalt (II). | 98 | 5.0 | 1.6 | 0.04 | >1,000 |

TABLE I—Continued

| Example No. | R₁ | R₂ | R₃ | Z | X | M | Catalyst | Unstabilized polymer Yield, percent | Unstabilized polymer (η) | Stabilized polymer (η) | Stabilized polymer $K_{211}$ | Toughness |
|---|---|---|---|---|---|---|---|---|---|---|---|---|
| 27 | —CH₃ | (naphthyl-CH₂—) | —CH₃ | S | | Co⁺² | Bis(dithio-3-naphthomethylacetonato) cobalt (II). | 96 | 4.8 | 1.5 | 0.05 | >1,000 |
| 28 | —CH₃ | —CH₂—CH=CH₂ | —CH₃ | S | | Co⁺² | Bis(dithio-3-allylacetonato) cobalt (II). | 92 | 4.6 | 1.6 | 0.07 | >1,000 |
| 29 | —CH₃ | —CH=CH—CH₂—CH₃ | —CH₃ | S | | Co⁺² | Bis(dithio-3-butenylacetylacetonato) cobalt (II). | 90 | 4.2 | 1.6 | 0.05 | >1,000 |
| 30 | —CH₃ | —OCH₃ | —CH₃ | S | | Co⁺² | Bis(dithio-3-methoxyacetylacetonato) cobalt (II). | 94 | 4.6 | 1.7 | 0.06 | >1,000 |
| 31 | —CH₃ | —OC₂H₅ | —CH₃ | S | | Co⁺² | Bis(dithio-3-ethoxyacetylacetonato) cobalt (II). | 94 | 4.8 | 1.6 | 0.05 | >1,000 |
| 32 | —CH₃ | —Br | —CH₃ | S | | Co⁺² | Bis(dithio-3-bromacetylacetonato) cobalt (II). | 95 | 4.0 | 1.6 | 0.05 | >1,000 |
| 33 | —CH₃ | —I | —CH₃ | S | | Co⁺² | Bis(dithio-3-iodacetylacetonato) cobalt (II). | 97 | 4.2 | 1.6 | 0.07 | >1,000 |
| 34 | —CH₃ | —COCH₃ | —CH₃ | S | | Co⁺² | Bis(dithio-3-acetylacetylacetonato) cobalt (II). | 97 | 4.5 | 1.6 | 0.04 | >1,000 |
| 35 | —CH₃ | —CO—(phenyl) | —CH₃ | S | | Co⁺² | Bis(dithio-3-benzoylacetylacetonato) cobalt (II). | 95 | 5.0 | 1.5 | 0.03 | >1,000 |
| 36 | —CH₃ | —CF₃ | —CH₃ | S | | Co⁺² | Bis(dithio-3-trifluoroacetylacetonato) cobalt (II). | 94 | 4.6 | 1.7 | 0.08 | >1,000 |
| 37 | —CH₃ | (bromophenyl) | —CH₃ | S | | Co⁺² | Bis(dithio-3-bromophenylacetylacetonato) cobalt (II). | 92 | 4.4 | 1.6 | 0.06 | >1,000 |
| 38 | —CH₃ | —H | —CH₃ | O | | Co⁺² | Bis(monothioacetylacetonato) cobalt (II). | 95 | 4.6 | 1.7 | 0.09 | >1,000 |
| 39 | —CH₃ | —H | —CH₃ | O | Acetylacetonato | Co⁺² | (Monothioacetylacetonato) (acetylacetonato) cobalt (II). | 90 | 4.0 | 1.6 | 0.03 | >1,000 |
| 40 | —CH₃ | (phenyl) | —CH₃ | O | | Co⁺² | Bis(monothio-3-phenylacetylacetonato) cobalt (II). | 98 | 5.0 | 1.8 | 0.03 | >1,000 |
| 41 | —CH₃ | Same as above | —CH₃ | O | Acetylacetonato | Co⁺² | (Monothio-3-phenylacetylacetonato) (acetylacetonato) cobalt (II). | 96 | 4.6 | 1.6 | 0.04 | >10,00 |
| 42 | —CH₃ | do | —CH₃ | O | | Fe⁺² | Bis(Monothio-3-phenylacetylacetonato) iron (II). | 95 | 3.0 | 1.7 | 0.03 | >1,000 |
| 43 | —CH₃ | do | —CH₃ | O | Acetylacetonato | Fe⁺² | (Monothio-3-phenylacetylacetonato) (acetylacetonato) iron (II). | 98 | 2.8 | 1.6 | 0.04 | >1,000 |
| 44 | —CH₃ | H | —CH₃ | S | | Co⁺³ | Tris(dithioacetylacetonato) cobalt (III). | 98 | 5.4 | 1.6 | 0.03 | >1,000 |
| 45 | —CH₃ | H | —CH₃ | S | | Ni⁺² | Bis(dithioacetylacetonato) nickel (II). | 94 | 4.2 | 1.7 | 0.08 | >1,000 |
| 46 | —CH₃ | H | —CH₃ | S | | Fe⁺³ | Tris(dithioacetylacetonato) iron (III). | 98 | 3.6 | 1.6 | 0.08 | >1,000 |
| 47 | —CH₃ | H | —CH₃ | S | | Fe⁺² | Bis(dithioacetylacetonato) iron (II). | 93 | 3.8 | 1.6 | 0.1 | >1,000 |
| 48 | —CH₃ | —H | —CH₃ | S | | Th⁺⁴ | Tetrakis(dithioacetylacetonato) thorium (IV). | 98 | 3.0 | 1.5 | 0.17 | >1,000 |

TABLE I—Continued

| Example No. | R₁ | R₂ | R₃ | Z | X | Catalyst | M | Unstabilized polymer Yield, percent | Unstabilized polymer (η) | Stabilized polymer (η) | Stabilized polymer $K_{22}$ | Stabilized polymer Toughness |
|---|---|---|---|---|---|---|---|---|---|---|---|---|
| 49 | —CH₃ | —H | —CH₃ | S | | Tris(dithioacetylacetonato) manganese (III). | Mn⁺³ | 99 | 4.7 | 1.7 | 0.05 | >1,000 |
| 50 | —CH₃ | —H | —CH₃ | S | | Bis(dithioacetylacetonato) manganese (II). | Mn⁺² | 99 | 4.9 | 1.8 | 0.08 | >1,000 |
| 51 | —CH₃ | —H | —CH₃ | S | | Tris(dithioacetylacetonato) chromium (III). | Cr⁺³ | 80 | 3.0 | 1.6 | 0.09 | >1,000 |
| 52 | —CH₃ | —H | —CH₃ | S | | Tris(dithioacetylacetonato) vanadium (III). | V⁺³ | 95 | 3.8 | 1.6 | 0.08 | >1,000 |
| 53 | —CH₃ | —H | —CH₃ | S | Cl | Bis[tris(dithioacetylacetonato) titanium (IV)]hexachlorotitanate (IV). | Ti | 98 | 3.0 | 1.7 | 0.10 | >1,000 |
| 54 | —CH₃ | —H | —CH₃ | S | | Tetrakis(dithioacetylacetonato) zirconium (IV). | Zr⁺⁴ | 94 | 4.2 | 1.8 | 0.05 | >1,000 |
| 55 | —CH₃ | —H | —CH₃ | S | | Bis(dithioacetylacetonato) copper (II). | Cu⁺² | 100 | 3.7 | 1.5 | 0.10 | >1,000 |
| 56 | —CH₃ | —H | —CH₃ | S | | (Dithioacetylacetonato) lithium. | Li | 97 | 3.8 | 1.7 | 0.10 | >1,000 |
| 57 | —CH₃ | —H | —CH₃ | S | | (Dithioacetylacetonato) potassium. | K | 94 | 3.0 | 1.5 | 0.10 | >1,000 |
| 58 | —CH₃ | —H | —CH₃ | S | | (Dithioacetylacetonato) sodium. | Na | 96 | 2.8 | 1.5 | 0.10 | >1,000 |
| 59 | —CH₃ | —H | —CH₃ | S | | Bis(dithioacetylacetonato) magnesium (II). | Mg⁺² | 92 | 4.5 | 1.5 | 0.10 | >1,000 |
| 60 | —CH₃ | —H | —CH₃ | S | | Bis(dithioacetylacetonato) calcium (II). | Ca⁺² | 90 | 3.2 | 1.4 | 0.18 | >1,000 |
| 61 | —CH₃ | —H | —CH₃ | S | | Bis(dithioacetylacetonato) beryllium (II). | Be⁺² | 94 | 3.8 | 1.6 | 0.10 | >1,000 |
| 62 | —CH₃ | —H | —CH₃ | S | | Bis(dithioacetylacetonato) zinc (II). | Zn⁺² | 95 | 3.2 | 1.7 | 0.10 | >1,000 |
| 63 | —CH₃ | —H | —CH₃ | S | | Bis(dithioacetylacetonato) cadmium (II). | Cd⁺² | 92 | 3.5 | 1.5 | 0.19 | >1,000 |
| 64 | —CH₃ | —H | —CH₃ | S | | Tris(dithioacetylacetonato) aluminum (III). | Al⁺³ | 80 | 3.2 | 1.6 | 0.10 | >1,000 |
| 65 | —CH₃ | —H | —CH₃ | S | | Bis(dithioacetylacetonato)(dimethylato) tin (VI). | Sn | 98 | 4.5 | 1.7 | 0.03 | >1,000 |
| 66 | —CH₃ | —H | —CH₃ | S | O (oxygen) | Bis(dithioacetylacetonato) oxovanadium (IV). | V⁺⁴ | 90 | 3.6 | 1.6 | 0.18 | >1,000 |
| 67 | —CH₃ | —H | —CH₃ | S | O (oxygen) | Bis(dithioacetylacetonato) oxomolybdenum (VI). | Mo⁺⁶ | 92 | 3.5 | 1.7 | 0.19 | >1,000 |
| 68 | —CH₃ | —H | —CH₃ | S | β-Diketonato | Bis(monothioacetylacetonato)-(acetylacetonato) cobalt (III). | Co⁺³ | 95 | 4.6 | 1.6 | 0.08 | >1,000 |
| 69 | —CH₃ | —H | —CH₃ | O | β-Diketonato | Bis(monothioacetylacetonato)-(propionylacetonato) cobalt (III). | Co⁺³ | 92 | 4.8 | 1.7 | 0.05 | >1,000 |
| 70 | CH₃ | —H | —CH₃ | O | β-Diketonato | Bis(monothioacetylacetonato)-(benzoylacetonato) cobalt (III). | Co⁺³ | 96 | 4.5 | 1.6 | 0.04 | >1,000 |

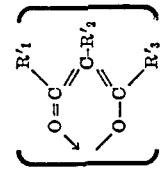
R'₁:CH₃, R'₂:CH₃, R'₃:H
R'₁:CH₃, R'₂:H, R'₃:C₂H₅

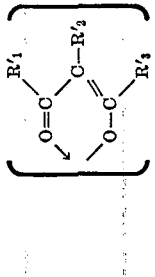

3,639,347

TABLE I—Continued

| Example No. | $R_1$ | $R_2$ | $R_3$ | Z | X | M | Catalyst | Unstabilized polymer Yield, percent | Unstabilized polymer $(\eta)$ | Stabilized polymer $(\eta)$ | Stabilized polymer $K_{122}$ | Toughness |
|---|---|---|---|---|---|---|---|---|---|---|---|---|
| 71 | —CH₃ | —H | —CH₃ | O | R'₁:CH₃, R'₂:H, R'₃: (phenyl) | Co⁺³ | Bis(monothioacetylacetonato)(naphthoylacetonato) cobalt (III). | 93 | 4.0 | 1.6 | 0.06 | >1,000 |
| 72 | —CH₃ | —H | —CH₃ | O | R'₁:CH₃, R'₂:H, R'₃: (phenyl) | Co⁺³ | Bis(monothioacetylacetonato)(phenylacetylacetonato) cobalt (III). | 90 | 4.0 | 1.6 | 0.04 | >1,000 |
| 73 | —CH₃ | —H | —CH₃ | O | β-Diketonato | Co⁺³ | Bis(monothioacetylacetonato)(naphthylacetylacetonato) cobalt (III). | 92 | 4.2 | 1.6 | 0.08 | >1,000 |
| 74 | —CH₃ | —H | —CH₃ | O | R'₁:CH₃, R'₂:H, R'₃:—CH₂—CH=CH₂ | Co⁺³ | Bis(monothioacetylacetonato)(allylacetylacetonato) cobalt (III). | 94 | 4.6 | 1.6 | 0.06 | >1,000 |
| 75 | —CH₃ | —CH₃ | —CH₃ | O | β-Diketonato $\left[\begin{array}{c}R'_1\\|\\O\end{array} \begin{array}{c}C'_2\\||\\ \end{array} \begin{array}{c}R'_3\\|\\O\end{array}\right]$ | Co⁺³ | Bis(monothioacetylacetonato)(5-dimethyl-4-heptnenoyl-acetonato) cobalt (III). | 94 | 4.4 | 1.7 | 0.06 | >1,000 |
| 76 | —CH₃ | —H | —CH₃ | O | R'₁:CH₃, R'₂:H, R'₃:—CH₂—CH=C(CH₃)₂ R'₁:CH₃, R'₂:H, R'₃:—OCH₃ | Co⁺³ | Bis(monothioacetylacetonato)(methoxycarbonylacetonato) cobalt (III). | 96 | 4.0 | 1.8 | 0.07 | >1,000 |
| 77 | —CH₃ | —H | —CH₃ | O | R'₁:CH₃, R'₂:H, R'₃:—OC₂H₅ | Co⁺³ | Bis(monothioacetylacetonato)(ethoxycarbonylacetonato) cobalt (III). | 95 | 3.9 | 1.7 | 0.06 | >1,000 |
| 78 | —CH₃ | —H | —CH₃ | O | R'₁:CH₃, R'₂:H, R'₃: (furyl) | Co⁺³ | Bis(monothioacetylacetonato)(thenoylacetonato) cobalt (III). | 97 | 5.0 | 1.6 | 0.03 | >1,000 |
| 79 | —CH₃ | —H | —CH₃ | O | Same as above | Co⁺³ | Bis(monothioacetylacetonato)(furoylacetonato) cobalt (III). | 96 | 4.6 | 1.6 | 0.05 | >1,000 |
| 80 | —CH₃ | —H | —CH₃ | O | R'₁:CH₃, R'₂:H, R'₃:—CF₃ | Co⁺³ | Bis(monothioacetylacetonato)(trifluoroacetylacetonato) cobalt (III). | 95 | 3.0 | 1.6 | 0.06 | >1,000 |
| 81 | —CH₃ | —H | —CH₃ | O | R'₁:CH₃, R'₂:H, R'₃:—CHCl₂ | Co⁺³ | Bis(monothioacetylacetonato)(dichloroacetylacetonato) cobalt (III). | 97 | 2.8 | 1.7 | 0.08 | >1,000 |

TABLE I—Continued

| Example No. | $R_1$ | $R_2$ | $R_3$ | Z | X | M | Catalyst | Unstabilized polymer Yield, percent | Unstabilized polymer $(\eta)$ | Stabilized polymer $(\eta)$ | Stabilized polymer $K_{222}$ | Toughness |
|---|---|---|---|---|---|---|---|---|---|---|---|---|
| 82 | $CH_3$ | H | $CH_3$ | O | β-Diketonato | $Co^{+3}$ | Bis(monothioacetylacetonato)-(iodacetylacetonato)cobalt (III). | 94 | 2.8 | 1.6 | 0.08 | >1,000 |
| 83 | $CH_3$ | H | $CH_3$ | O | [structure with $R'_1$, $R'_2$, $R'_3$ on ring with Br]; $R'_1$:$CH_3$, $R'_2$:H, $R'_3$:—$CH_2$I | $Co^{+3}$ | Bis(monothioacetylacetonato)-(bromobenzoylacetonato) cobalt (III). | 96 | 3.6 | 1.6 | 0.06 | >1,000 |
| 84 | $CH_3$ | H | $CH_3$ | O | $R'_1$:$CH_3$, $R'_2$:$CH_3$, $R'_3$:$CH_3$ | $Co^{+3}$ | Bis(monothioacetylacetonato)-(3-methylacetylacetonato) cobalt (III). | 88 | 3.8 | 1.6 | 0.05 | >1,000 |
| 85 | $CH_3$ | H | $CH_3$ | O | $R'_1$:$CH_3$, $R'_2$:$C_2H_5$, $R'_3$:$CH_3$ | $Co^{+3}$ | Bis(monothioacetylacetonato)-(3-ethylacetylacetonato) cobalt (III). | 85 | 3.6 | 1.6 | 0.04 | >1,000 |
| 86 | $CH_3$ | H | $CH_3$ | O | [phenyl structure] $R'_1$:$CH_3$, $R'_2$:H, $R'_3$: | $Co^{+3}$ | Bis(monothioacetylacetonato)-(3-phenylacetylacetonato) cobalt (III). | 100 | 5.6 | 1.5 | 0.03 | >1,000 |
| 87 | $CH_3$ | H | $CH_3$ | O | [naphthyl structure] $R'_1$:$CH_3$, $R'_2$:H, $R'_3$: | $Co^{+3}$ | Bis(monothioacetylacetonato)-(3-naphthylacetylacetonato) cobalt (III). | 98 | 5.5 | 1.6 | 0.03 | >1,000 |
| 88 | —$CH_3$ | —H | —$CH_3$ | O | β Diketonato | $Co^{+3}$ | Bis(monothioacetylacetonato)-(3-benzylacetylacetonato) cobalt (III). | 96 | 5.2 | 1.6 | 0.04 | >1,000 |
| 89 | —$CH_3$ | —H | —$CH_3$ | O | [phenyl structure] $R'_1$:$CH_3$, $R'_2$:—$CH_2$—, $R'_3$:$CH_3$ | $Co^{+3}$ | Bis(monothioacetylacetonato)-(3-naphthomethylacetylacetonato) cobalt (III). | 98 | 5.4 | 1.5 | 0.04 | >1,000 |
| 90 | —$CH_3$ | —H | —$CH_3$ | O | [naphthyl structure] $R'_1$:$CH_3$, $R'_2$:—$CH_2$—$CH$=$CH$, $R'_3$:$CH_3$ | $Co^{+3}$ | Bis(monothioacetylacetonato)-(3-allylacetylacetonato) cobalt (III). | 94 | 5.0 | 1.6 | 0.03 | >1,000 |

TABLE I—Continued

| Example No. | $R_1$ | $R_2$ | $R_3$ | Z | X | M | Catalyst | Unstabilized polymer Yield, percent | Unstabilized polymer $(\eta)$ | Stabilized polymer $(\eta)$ | Stabilized polymer $K_{222}$ | Toughness |
|---|---|---|---|---|---|---|---|---|---|---|---|---|
| 91 | —CH₃ | —H | —CH₃ | O | R′₁:CH₃, R′₂:—CH=CH₂—CH₂—CH₃, R′₃:CH₃ | Co⁺³ | Bis(monothioacetylacetonato)(3-butenylacetylacetonato) cobalt (III). | 95 | 4.8 | 1.7 | 0.03 | >1,000 |
| 92 | —CH₃ | —H | —CH₃ | O | R′₁:CH₃, R′₂:—OCH₃, R′₃:CH₃ | Co⁺³ | Bis(monothioacetylacetonato)(3-methoxyacetylacetonato) cobalt (III). | 95 | 4.6 | 1.6 | 0.04 | >1,000 |
| 93 | —CH₃ | —H | —CH₃ | O | β-Diketonato R′₁:CH₃, R′₂:—OC₂H₅, R′₃:CH₃ | Co⁺³ | Bis(monothioacetylacetonato)(3-ethoxyacetylacetonato) cobalt (III). | 94 | 4.4 | 1.6 | 0.05 | >1,000 |
| 94 | —CH₃ | —H | —CH₃ | O | R′₁:CH₃, R′₂:—C—CH₃, R′₃:CH₃ (=O) | Co⁺³ | Bis(monothioacetylacetonato)(3-acetylacetylacetonato) cobalt (III). | 98 | 5.0 | 1.7 | 0.03 | >1,000 |
| 95 | —CH₃ | —H | —CH₃ | O | R′₁:CH₃, R′₂:—C(=O)—C₆H₄—, R′₃:CH₃ | Co⁺³ Co⁺³ | Bis(monothioacetylacetonato)(3-benzoylacetylacetonato) cobalt (III). | 96 | 5.2 | 1.6 | 0.03 | >1,000 |
| 96 | —CH₃ | —H | —CH₃ | O | N,N′-ethylenebis(salicylideneimine) | Co⁺³ | (Monothioacetylacetonato)-N,N′-ethylene-bis(salicylideneiminato) cobalt (III). | 96 | 5.2 | 1.5 | 0.03 | >1,000 |
| 97 | —CH₃ | —H | —CH₃ | O | N,N′-ethylenebis(acetyl-acetylideneimine) | Co⁺³ | Monothioacetylacetonato)-N,N′-ethylene-bis(acetylacetylideneiminato) cobalt (III). | 98 | 5.0 | 1.6 | 0.03 | >1,000 |
| 98 | —CH₃ | —H | —CH₃ | O | Salicylaldehyde | Co⁺³ | Bis(monothioacetylacetonato)(salicylaldehydato) cobalt (III). | 95 | 4.9 | 1.6 | 0.03 | >1,000 |
| 99 | —CH₃ | —H | —CH₃ | O | 5-methylsalicylaldehyde | Co⁺³ | Bis(monothioacetylacetonato)(5-methylsalicylaldehydato) cobalt (III). | 94 | 4.7 | 1.6 | 0.03 | >1,000 |
| 100 | —CH₃ | —H | —CH₃ | O | N,N′-hexamethylene-bis(salicylideneimine) | Co⁺³ | (Monothioacetylacetonato)-N,N′-hexamethylene-bis(salicylideneiminato) cobalt (III). | 96 | 4.8 | 1.6 | 0.03 | >1,000 |
| 101 | —CH₃ | —H | —CH₃ | O | Cl | Co⁺³ | Bis(monothioacetylacetonato)(dichlorato) cobalt (III). | 95 | 3.4 | 1.7 | 0.04 | >1,000 |
| 102 | —CH₃ | —H | —CH₃ | O | Br | Co⁺³ | Bis(monothioacetylacetonato)(dibromato) cobalt (III). | 96 | 3.6 | 1.6 | 0.05 | >1,000 |
| 103 | —CH₃ | —H | —CH₃ | O | N,N′-hexamethylene-bis(acetylacetylideneimine) | Co⁺³ | (Monothioacetylacetonato)-N,N′-hexamethylene-bis(acetylacetylideneiminato) cobalt (III). | 98 | 5.4 | 1.6 | 0.03 | >1,000 |

EXAMPLES 104–112

One hundred-and-fifty (150) g. of commercial α-polyoxymethylene containing 1.2% of water, 1.0% of methanol and 0.05% of formic acid was placed in a 1-liter capacity three-neck flask, and heated to 160–180° C. Whereupon the α-polyoxymethylene was pyroylzed and generated formaldehyde gas. The gas was passed through eight U-shaped tubular traps (inner diameter: 15 mm., length: 60 cm.) which were maintained at −15° C, to be sufficiently removed of the impurities, and led through a flow meter into a 2-liter capacity four-neck flask. In that flask the formaldehyde gas was absorbed in one liter of toluene which was cooled to approximately −50° C. The gas supply was stopped when 100 g. of formaldehyde was absorbed in the toluene.

To the resultant toluene solution of formaldehyde, each 0.001 millimol of the catalysts listed in Table 2 were added, and the formaldehyde was polymerized for 60 minutes at the toluene solution temperature of 0° C. Then the polymerization reaction was terminated by adding 200 cc. of methanol to the resultant polyoxymethylene suspension. The produced polyoxymethylene was treated in the manner similar to Example 1 in each run. The intrinsic viscosities $[\eta]$, yields, and melting points of the products are shown in Table 2.

The polyoxymethylenes were stabilized by identical chipping stabilization process with that described in Example 1. The intrinsic viscosities $[\eta]$, thermal decomposition constants $K_{222}$, and toughness of so acetylated polyoxymethylenes are also given in Table 2.

min. From another neck of the flask, a gaseous mixture of the carbon dioxide with the formaldehyde released by the thermal decomposition at the rate of approximately 400 cc. (in terms of N.T.P.)/min. was withdrawn, and led into the cooled autoclave through one of the needle valves. The other needle valve was left open to a dry atmosphere. The gaseous mixture was liquefied in the autoclave, and converted to a mixed solution of formaldehyde and carbon dioxide. The introduction of the gaseous mixture was continued for 120 minutes, and the two needle valves were closed. In the autoclave, approximately 64 g. of formaldehyde and approximately 71 g. of carbon dioxide were supplied.

The autoclave was placed in an aqueous bath of approximately 10° C., and the glass ampule was broken to let out the toluene solution of bis(dithioacetylacetone) cobalt into the liquid mixture of formaldehyde and carbon dioxide. Thereupon initiated polymerization was continued for 60 minutes at approximately 10° C. under stirring. Thereafter the needle valves were opened to discharge carbon dioxide and unreacted formaldehyde gas.

TABLE 2

| Example No. | Catalyst | Polymer | | | Stabilized polymer | | |
|---|---|---|---|---|---|---|---|
| | | Yield % | $[\eta]$ | M.p., °C. | $[\eta]$ | $K_{222}$ | Toughness |
| 104 | Tris(monothio-3-phenylacetylacetonato) cobalt (III) | 100 | 12.0 | 185 | 1.7 | 0.09 | >1,000 |
| 105 | Bis(dithio-3-phenylacetylacetonato) Nickel (II) | 99 | 10.5 | 183 | 1.8 | 0.07 | >1,000 |
| 106 | Bis(thio-thenoyltrifluoroacetonato) copper (II) | 98 | 8.4 | 183 | 1.7 | 0.12 | >1,000 |
| 107 | Bis(thio-3-phenylacetylacetonato) hexamethylene-bis-(salicylideneiminato) thorium (IV). | 100 | 13.1 | 200 | 1.6 | 0.03 | >1,000 |
| 108 | (Monothio-3-acethy-dibenzoylacetonato) orthophenylene-bis(acetylacetylideneiminato) manganese (III). | 100 | 12.3 | 185 | 1.6 | 0.03 | >1,000 |
| 109 | Bis(dithio-3-butenylacetylacetonato) oxovanadium (IV) | 99 | 11.6 | 186 | 1.7 | 0.04 | >1,000 |
| 110 | Bis(dithio-3-benzyl-benzoylacetonato)(diethylato) tin (VI) | 98 | 10.1 | 184 | 1.6 | 0.03 | >1,000 |
| 111 | Bis(monothiofuroylacetonato) zinc (II) | 95 | 8.5 | 182 | 1.8 | 0.10 | >1,000 |
| 112 | Bis(dithiomethoxycarbonylacetonato) iron (II) | 96 | 7.2 | 182 | 1.8 | 0.10 | >1,000 |

EXAMPLES 113–122

Example 104 was repeated except that the catalyst of Example 105 was used and the polymerization reaction conditions were varied in each run as indicated in Table 3. The results are also given in Table 3 below.

The autoclave was opened, and 200 cc. of methanol was added to the content thereof. The produced polyoxymethylene slurry was withdrawn, and removed of glass fragments by means of decantation. The product was thereafter treated in the manner similar to Example 1,

TABLE 3

| Example No. | Catalyst amount, millimol | Monomer concentration, percent | Solvent | Reaction temperature, °C. | Polymerization atmosphere | Reaction pressure | Reaction time, min. | Polymer | | | Stabilized polymer | | |
|---|---|---|---|---|---|---|---|---|---|---|---|---|---|
| | | | | | | | | Yield, percent | $[\eta]$ | M.P. °C. | $[\eta]$ | $K_{222}$ | Toughness |
| 113 | 1.0 | 10 | Toluene, water (20 p.p.m.). | 0 | $N_2$ | Normal pressure. | 60 | 100 | 8.5 | 183 | 1.8 | 0.05 | >1,000 |
| 114 | 1.0 | 10 | do | −50 | $N_2$ | do | 180 | 92 | 13.0 | 185 | 1.6 | 0.04 | >1,000 |
| 115 | 1.0 | 10 | do | 0–50 | $N_2$ | do | { 1 10 / 2 20 } | 98 | 7.8 | 182 | 1.7 | 0.06 | >1,000 |
| 116 | 0.001 | 10 | Acetone | 0 | $N_2$ | do | 60 | 98 | 8.5 | 182 | 1.8 | 0.05 | >1,000 |
| 117 | 1.0 | 10 | Methylene-dicarboxylate. | 0 | $N_2$ | do | 60 | 95 | 6.5 | 180 | 1.8 | 0.05 | >1,000 |
| 118 | 1.0 | 10 | Toluene | 0 | Air | do | 60 | 92 | 8.0 | 183 | 1.7 | 0.05 | >1,000 |
| 119 | 1.0 | 10 | do | 0 | CO | do | 60 | 96 | 11.0 | 184 | 1.6 | 0.07 | >1,000 |
| 120 | 0.001 | 3 | do | 0 | $N_2$ | do | 60 | 95 | 10.5 | 185 | 1.7 | 0.06 | >1,000 |
| 121 | 0.001 | 50 | do | 0 | $N_2$ | do | 60 | 100 | 11.0 | 184 | 1.9 | 0.04 | >1,000 |
| 122 [3] | 0.001 | 10 | do | 0 | $N_2$ | 100 kg./cm.² | 60 | 100 | 12.5 | 185 | 1.8 | 0.05 | >1,000 |

[1] At 0° C.
[2] At 50° C.
[3] Reaction was carried out in a stainless steel autoclave having a capacity of one litre ($N_2$ gas pressure).

EXAMPLE 123

A 500-cc. capacity, stainless steel autoclave with two entrance and exit controlled by needle valves, and an electromagnetic stirrer, was charged with a 2-cc. capacity glass ampule in which a solution composed of 0.01 millimol of bis(dithioacetylacetone) cobalt and 1 cc. of toluene was sealed, and a stainless steel ball. The inside of the autoclave was then cooled to approximately −70° C. while dry nitrogen gas was passed therethrough. 100 grams of dehydrated α-polyoxymethylene was placed in a 1-liter capacity, three neck flask, and thermally decomposed therein in the atmosphere of carbon dioxide gas supplied from a bomb through one neck of the flask at a rate of approximately 300 cc. (in terms of N.T.P.)/ and 61 g. of polyoxymethylene having an intrinsic viscosity $[\eta]$ of 4.6 was obtained. Upon stabilization thereof similarly to that in Example 1, an acetylated polyoxymethylene of the following properties was obtained: $[\eta]=1.7$, $K_{222}=0.1$ percent/min., and toughness of not less than 1,000.

EXAMPLES 124–136

10 g. of purified formaldehyde prepared in the same manner as in Example 104 were dissolved in 100 cc. of toluene cooled to about −50° C., impurities of amounts described in Table 4 were added to the solution, 0.0001 millimol of tris (monothio-3-phenylacetylacetonato) cobalt (III) was further aded to the solution as catalyst, and thereafter the process of Example 104 was repeated. The results are given in the same table.

While warm water of approximately 40° C. was circulated through the jacket, n-pentane solution of each of the catalysts specified in Table 5 at the concentration

TABLE 4

| Example No. | Impurities | Quantity, g. | Polymer | | | | |
|---|---|---|---|---|---|---|---|
| | | | Unstabilized | | Stabilized | | |
| | | | Yield, percent | $[\eta]$ | $[\eta]$ | $K_{222}$ | Toughness |
| 124 | Methanol | 1.0 | 65 | 1.5 | 1.0 | 0.10 | >1,000 |
| 125 | | 0.5 | 78 | 7.0 | 1.7 | 0.11 | >1,000 |
| 126 | | 0.1 | 100 | 10.0 | 2.4 | 0.03 | >1,000 |
| 127 | Water | 0.5 | 60 | 1.6 | 1.0 | 0.08 | >1,000 |
| 128 | | 0.2 | 85 | 9.4 | 1.8 | 0.13 | >1,000 |
| 129 | | 0.1 | 90 | 9.7 | 2.4 | 0.04 | >1,000 |
| 130 | Formic acid | 0.3 | 60 | 1.6 | 1.0 | 0.09 | >1,000 |
| 131 | | 0.1 | 70 | 6.8 | 1.7 | 0.12 | >1,000 |
| 132 | | 0.01 | 95 | 9.8 | 2.5 | 0.05 | >1,000 |
| 133 | Acetic anhydride | 1.0 | 85 | 1.8 | 1.2 | 0.08 | >1,000 |
| 134 | | 0.5 | 90 | 5.4 | 1.8 | 0.06 | >1,000 |
| 135 | | 0.2 | 93 | 9.0 | 1.8 | 0.12 | >1,000 |
| 136 | Methanol<br>Water<br>Formic acid | 0.5<br>0.2<br>0.05 | 72 | 2.3 | 1.5 | 0.05 | >1,000 |

EXAMPLES 137–140

Blow polymerization and vapor phase polymerization of formaldehyde were practiced as follows, employing the polymerization catalysts specified in Table 5. The results are also given in the same table.

Blow polymerization

Each 0.02 millimol of the polymerization catalysts specified in Table 5 was dissolved in 2 liters of n-heptane in a 3-liter capacity, three neck flask. While the solution was maintained at 25° C., refined formaldehyde gas as employed in Example 104 was introduced thereinto at a rate of 0.5 g./min., under stirring. With the introduction of formaldehyde gas, white, powdery polyoxymethylene was formed. After four hours, the introduction was stopped, and the produced polymer was subjected to the similar post treatments as described in Example 1.

Thus obtained polyoxymethylene was stabilized by chipping stabilization process, in the manner similar to Example 1.

Vapor phase polymerization

As the polymerization vessel, a cylindrical glass column of 10 cm. in inner diameter and 150 cm. in height was employed. The side walls of the column was surrounded by a jacket, and on the top thereof a nozzle with 30 holes of 0.5 mm. in diameter and an exit of exhaust gas were provided. The catalyst solution was supplied into the column in the misty state through the nozzle. On a lower side wall of the column a feed entrance of 20 mm. in diameter was opened for formaldehyde gas supply, and an exit of 5 cm. in diameter for withdrawing the powdery polymerization product was provided at the bottom.

of 0.01 millimol per liter was sprayed into the polymerization column at a rate of 10 cc./min. Simultaneously, the refined formaldehyde gas prepared in the similar manner to Example 104 was supplied into the column through the feed entrance, at a rate of 400 cc. (in terms of N.T.P.)/min. The formaldehyde gas entering into the column was immediately polymerized upon contact with the catalyst solution sprayed from the top of the column, and the powdery polyoxymethylene product accumulated on the bottom of the column. The polymer was continuously withdrawn from the exit, whereas the n-pentane was gasified and discharged through the exhaust, together with unreacted formaldehyde gas.

The formaldehyde gas was continuously supplied for 100 minutes. The polyoxymethylene obtained in the meantime was washed with methanol and acetone, and dried for 2 hours at 80° C. under a reduced pressure.

The un-stabilized polyoxymethylene was stabilized by the similar chipping stabilization process as described in Example 1, and converted to acetylated polyoxymethylene.

TABLE 5

| Example No. | Polymerization | Catalyst | Polymer | | | | | |
|---|---|---|---|---|---|---|---|---|
| | | | Unstabilized | | | Stabilized | | |
| | | | Yield percent | $[\eta]$ | M.P., ° C. | $[\eta]$ | $K_{222}$ | Toughness |
| 137 | Blow polymerization | Bis(dithioacetylacetonato) cobalt (II) | 92 | 7.0 | 182 | 2.0 | 0.08 | >1,000 |
| 138 | | Tetrakis(monothio-3-phenylacetylacetonato) thorium (IV) | 97 | 7.8 | 183 | 1.8 | 0.05 | >1,000 |
| 139 | Vapor phase polymerization | Bis(dithioacetylacetonato) cobalt (II) | 94 | 5.8 | 179 | 1.8 | 0.05 | >1,000 |
| 140 | | (Monothio-3-acetyl-dibenzoylacetonato)-orthophenylenebis(salicylideneiminato) manganese (III) | 90 | 6.5 | 181 | 1.7 | 0.04 | >1,000 |

EXAMPLES 141–148

Example 105 was repeated, except that in each run the comonomer indicated in Table 6 was added to the formaldehyde solution at a ratio of 10% to the formaldehyde, and copolymerized therewith. The results are also given in Table 6.

EXAMPLE 149

Example 137 was repeated, except that together with the formaldehyde, carbon monoxide gas was continuously supplied into the reaction medium at a flow rate of $CO/CH_2O = 1/10$. The result is given in Table 6.

TABLE 6

| Ex. No. | Comonomer | Polymer properties | | | | |
|---|---|---|---|---|---|---|
| | | Yield (to formaldehyde) | M.P. (° C.) | [η] | K₂₂₂ | Toughness |
| 141 | Ethylene oxide | 102 | 170 | 3.2 | 0.14 | >1,000 |
| 142 | Propylene oxide | 104 | 165 | 2.8 | 0.18 | >1,000 |
| 143 | 1,3-dioxolan | 102 | 166 | 3.4 | 0.10 | >1,000 |
| 144 | 5-phenyl-1,3-dioxolan | 100 | 166 | 3.0 | 0.12 | >1,000 |
| 145 | Ethyleneimine | 102 | 168 | 3.6 | 0.08 | >1,000 |
| 146 | N-acetylethyleneimine | 103 | 165 | 3.0 | 0.07 | >1,000 |
| 147 | Ketene | 85 | 166 | 3.2 | 0.10 | >1,000 |
| 148 | Dimethylketene | 90 | 165 | 2.8 | 0.10 | >1,000 |
| 149 | Carbon monoxide | 88 | 172 | 3.2 | 0.20 | >1,000 |

EXAMPLES 150–153

Example 104 was repeated except that, besides the main catalytic component, tris(monothio-3-phenylacetylacetonato)cobalt (III)—indicated as A—a second catalytic component as indicated in Table 7 (B) was concurrently used. The results are also given in Table 7.

TABLE 7

| Ex. No. | Second catalytic component (B) | B/A | Initial polymerization rate (mol/mol. min.) | Unstabilized polymer | | | | Stabilized polymer, K₂₂₂ |
|---|---|---|---|---|---|---|---|---|
| | | | | M.P. (° C.) | [η] | K₂₂₂ | Toughness | |
| 150 | BF₃OEt₂ | 1/10 | 5.7×10⁵ | 178 | 8.5 | 1.2 | >1,000 | 0.08 |
| Control | BF₃OEt₂ only | ∞ | 2.8×10⁵ | 172 | 0.8 | 8.5 | | 0.09 |
| Control | Main catalyst (A) only | 0 | 3.1×10³ | 185 | 12.0 | 1.0 | >1,000 | |
| 151 | SnCl₄ | 1/10 | 3.8×10⁶ | 177 | 7.8 | 1.4 | >1,000 | 0.07 |
| Control | SnCl₄ only | ∞ | 2.6×10⁶ | 170 | 0.9 | 6.8 | | |
| 152 | N(C₂H₅)₃ | 1/10 | 3.3×10⁶ | 182 | 10.8 | 1.2 | >1,000 | 0.04 |
| Control | N(C₂H₅)₃ only | ∞ | 6.6×10⁵ | 180 | 2.2 | 1.6 | >100 | 0.05 |
| 153 | 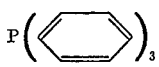 | 1/10 | 1.3×10⁶ | 182 | 11.0 | 1.0 | >1,000 | 0.05 |
| Control | 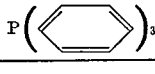 only | ∞ | 8.5×10⁵ | 178 | 2.8 | 1.4 | >100 | 0.05 |

EXAMPLES 154–155

Example 141 was repeated, except that the comonomer to be copolymerized as in Example 150 was varied to those indicated in Table 8. The results are also given in the same table.

TABLE 8

| Ex. No. | Second catalytic component (B) | B/A | Comonomer | Unstabilized Polymer | | | | Stabilized polymer, K₂₂₂ |
|---|---|---|---|---|---|---|---|---|
| | | | | M.P. (° C.) | [η] | K₂₂₂ | Toughness | |
| 154 | BF₃OEt₂ | 1/10 | Ethylene oxide | 168 | 3.2 | 0.04 | >1,000 | |
| 155 | BF₃OEt₂ | 1/10 | 1,3-dioxolane | 166 | 3.0 | 0.03 | >1,000 | |

We claim:

1. Process for the preparation of high molecular weight polyoxymethylene, which comprises polymerizing formaldehyde or a mixture of formaldehyde with a compound copolymerizable therewith, selected from the group consisting of carbon monoxide, ketenes of 2 to 14 carbon atoms, alkylene oxides, dioxolanes, and alkyleneimines, in the presence of a catalytic quantity of a compound represented by the general formula:

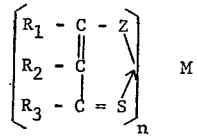

wherein
each $R_1$ and $R_3$ is a radical selected from a group consisting of monovalent hydrocarbons of 1 to 20 carbons, alkoxy group of 1 to 10 carbons, thienyls, furyls, and halogen-substituted compounds of the foregoing;

$R_2$ is selected from a group consisting of hydrogen, halogen, monovalent hydrocarbons of 1 to 20 carbons, alkoxy group of 1 to 10 carbons, and acyl group of 2 to 10 carbons;

Z is an atom selected from a group consisting of sulfur and oxygen;

M is selected from the group consisting of transition metals, alkali metals, alkaline earth metals, aluminum, tin, zinc, and cadmium; and $n$ is the valence of metal M.

2. The process of claim 1 in which the compound of the general formula is caused to be present in the polymerization system in a quantity of $10^{-4}$–10 millimols per mol of formaldehyde or a mixture of formaldehyde and the compound copolymerizable therewith.

3. The process of claim 1 in which the polymerization is performed at temperatures ranging approximately $-78°$ – $+100°$ C.

4. The process of claim 1, in which the metal represented by M is selected from a group consisting of cobalt, nickel, iron, thorium, manganese, copper, tin, zinc and cadmium.

5. Process for the preparation of high molecular weight polyoxymethylene, which comprises polymerizing formaldehyde or a mixture of formaldehyde with a compound copolymerizable therewith, selected from the group consisting of carbon monoxide, ketenes of 2 to 14 carbon atoms, alkylene oxides, dioxolanes, and alkylene-imines, in the presence of a catalytic quantity of a compound represented by the general formula:

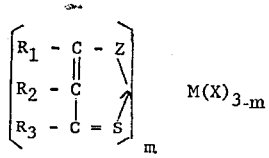

wherein
each of $R_1$ and $R_3$ is a radical selected from a group consisting of monovalent hydrocarbons of 1 to 20 carbons, alkoxy group of 1 to 10 carbons, thienyls, furyls, and halogen-substituted compounds of the foregoing;
$R_2$ is selected from a group consisting of hydrogen, halogen, monovalent hydrocarbons of 1 to 20 carbons, alkoxy group of 1 to 10 carbons, and acyl group of 2 to 10 carbons;
Z is an atom selected from a group consisting of sulfur and oxygen;
M is selected from the group consisting of transition metals, alkaline earth metals, aluminum, tin, zinc, and cadmium;
X is a ligand selected from the group consisting of
(a) β-diketones of the formula:

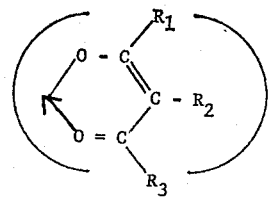

(b) aromatic hydroxy-aldehydes of the formula:

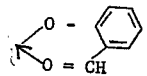

(c) condensates of said β-diketones with aliphatic and aromatic diamines of 2 to 12 carbon atoms; and
(d) condensates of said aromatic hydroxy-aldehyde with aliphatic or aromatic diamines of 2 to 12 carbon atoms; and
$m$ is an integer of 1 or 2 with proviso that $m$ is 2 when X is (a) or (b) and $m$ is 1 when X is (c) or (d).

6. The process of claim 5 wherein said compound is present in the polymerization system in a quantity of $10^{-4}$–10 millimols per mol of formaldehyde or a mixture of formaldehyde and said compound copolymerizable therewith.

7. The process of claim 5 wherein the polymerization is performed at a temperature of from about −78° to about +100° C.

8. The process of claim 5 wherein the metal represented by M is selected from a group consisting of cobalt, nickel, iron, thorium, manganese, copper, tin, zinc and cadmium.

9. Process for the preparation of high molecular weight polyoxymethylene, which comprises polymerizing formaldehyde or a mixture of formaldehyde with a compound copolymerizable therewith, selected from the group consisting of carbon monoxide, ketenes of 2 to 14 carbon atoms, alkylene oxides, dioxolanes, and alkylene-imines, in the presence of a catalytic quantity of a compound represented by the general formula:

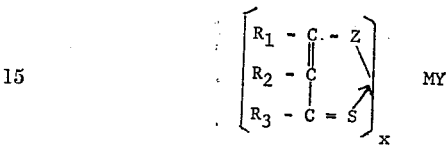

wherein
each of $R_1$ and $R_3$ is a radical selected from a group consisting of monovalent hydrocarbons of 1 to 20 carbons, alkoxy group of 1 to 10 carbons, thienyls, furyls, and halogen-substituted compounds of the foregoing;
$R_2$ is selected from a group consisting of hydrogen, halogen, monovalent hydrocarbons of 1 to 20 carbons, alkoxy group of 1 to 10 carbons, and acyl group of 2 to 10 carbons;
Z is an atom selected from a group consisting of sulfur and oxygen;
M is selected from the group consisting of transition metals, alkaline earth metals, aluminum, tin, zinc, and cadmium; and
Y is an oxygen or halogen atom and $x$ is a number equal to the valence of metal M minus the valence of Y with the proviso that $x$ is always at least 1.

10. The process of claim 9 wherein said compound is present in the polymerization system in a quantity of $10^{-4}$–10 millimols per mol of formaldehyde or a mixture of formaldehyde and said compound copolymerizable therewith.

11. The process of claim 9 wherein the polymerization is performed at a temperature of from about −78° to about +100° C.

12. The process of claim 9 wherein the metal represented by M is selected from a group consisting of cobalt, nickel, iron, thorium, manganese, copper, tin, zinc and cadmium.

References Cited
UNITED STATES PATENTS 3,305,529   2/1967   Reynolds _____ 260—67
3,458,483   7/1969   Dubsky et al. _____ 260—78.3

WILLIAM H. SHORT, Primary Examiner
L. M. PHYNES, Assistant Examiner

U.S. Cl. X.R.
260—67 FP, 67.5

UNITED STATES PATENT OFFICE
CERTIFICATE OF CORRECTION

Patent No. 3,639,347                Dated February 1, 1972

Inventor(s) Shotaro Sugiura et al.

It is certified that error appears in the above-identified patent and that said Letters Patent are hereby corrected as shown below:

Table I, Example No. 41 delete " >10,00" and insert -- >1,000 --.

Signed and sealed this 18th day of July 1972.

(SEAL)
Attest:

EDWARD M. FLETCHER, JR.          ROBERT GOTTSCHALK
Attesting Officer                 Commissioner of Patents